United States Patent
Hogaboam et al.

(10) Patent No.: US 11,710,058 B2
(45) Date of Patent: Jul. 25, 2023

(54) APPARATUS AND METHOD FOR RECOMPILATION OF QUANTUM CIRCUITS TO COMPENSATE FOR DRIFT IN A QUANTUM COMPUTER

(71) Applicant: Intel Corporation, Santa Clara, CA (US)

(72) Inventors: Justin Hogaboam, Aloha, OR (US); Adam Holmes, Chicago, IL (US)

(73) Assignee: Intel Corporation, Santa Clara, CA (US)

(*) Notice: Subject to any disclaimer, the term of this patent is extended or adjusted under 35 U.S.C. 154(b) by 819 days.

(21) Appl. No.: 16/024,819

(22) Filed: Jun. 30, 2018

(65) Prior Publication Data
US 2019/0042969 A1    Feb. 7, 2019

(51) Int. Cl.
*G06N 10/00* (2022.01)
(52) U.S. Cl.
CPC .................................. *G06N 10/00* (2019.01)
(58) Field of Classification Search
CPC ....................................................... G06N 10/00
See application file for complete search history.

(56) References Cited

U.S. PATENT DOCUMENTS

| | | | |
|---|---|---|---|
| 2009/0259905 | A1† | 10/2009 | Silva et al. |
| 2017/0017894 | A1† | 1/2017 | Lanting et al. |
| 2017/0308803 | A1† | 10/2017 | Wallman et al. |
| 2018/0330265 | A1† | 11/2018 | Kelly |

FOREIGN PATENT DOCUMENTS

| | | |
|---|---|---|
| EP | 3300004 A1 | 3/2018 |
| WO | 2017/078734 A1 | 5/2017 |
| WO | 2019054995 † | 3/2019 |

OTHER PUBLICATIONS

Blume-Kohout, "Controlling qubit drift by recycling error correction syndromes," Feb. 2015, https://www.osti.gov/biblio/1504596-controlling-qubit-drift-recycling-error-correction-syndromes (Year: 2015).*
Cody Jones et al., "Layered architecture for quantum computing", arxiv.org, Cornell University Library, Sep. 27, 2012, pp. 1-27.
European search report and Search Opinion, EP App. No 19178891.8, dated Nov. 26, 2019, 11 pages.
Riesebos et al., "Pauli Frames for Quantum Computer Architectures", 2017 54th ACM/EDAC/IEEE Design Automation Conference (DAC), Jun. 2017, 6 pages.
European Communication pursuant to Article 94(3) EPC, EP App. No. 19178891.8, dated May 19, 2021, 9 pages.

\* cited by examiner
† cited by third party

*Primary Examiner* — Matthew L Reames
(74) *Attorney, Agent, or Firm* — Nicholson De Vos Webster & Elliott LLP (57) ABSTRACT

Apparatus and method for quantum drift compensation. For example, one embodiment of a quantum system comprises: a quantum processor comprising one or more data quantum bits (qubits) and one or more ancilla qubits; a quantum controller to control the qubits responsive to a quantum runtime; an error detector to detect errors in the qubits; a quantum drift compensator to determine a current system drift for the quantum processor based on the errors and to responsively generate a set of compensation values if the current system drift is determined to be above a threshold.

24 Claims, 8 Drawing Sheets

APPARATUS AND METHOD FOR RECOMPILATION OF QUANTUM CIRCUITS TO COMPENSATE FOR DRIFT IN A QUANTUM COMPUTER

BACKGROUND

Field of the Invention

The embodiments of the invention relate generally to the field of quantum computing. More particularly, these embodiments relate to an apparatus and method for recompilation of quantum circuits to compensate for drift in a quantum computer.

Description of the Related Art

Quantum computing refers to the field of research related to computation systems that use quantum mechanical phenomena to manipulate data. These quantum mechanical phenomena, such as superposition (in which a quantum variable can simultaneously exist in multiple different states) and entanglement (in which multiple quantum variables have related states irrespective of the distance between them in space or time), do not have analogs in the world of classical computing, and thus cannot be implemented with classical computing devices.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

INTRODUCTION

A quantum computer uses quantum-mechanical phenomena such as superposition and entanglement to perform computations. In contrast to digital computers which store data in one of two definite states (0 or 1), quantum computation uses quantum bits (qubits), which can be in superpositions of states. Qubits may be implemented using physically distinguishable quantum states of elementary particles such as electrons and photons. For example, the polarization of a photon may be used where the two states are vertical polarization and horizontal polarization. Similarly, the spin of an electron may have distinguishable states such as "up spin" and "down spin."

Qubit states are typically represented by the bracket notations |0) and |1). In a traditional computer system, a bit is exclusively in one state or the other, i.e., a '0' or a '1.' However, qubits in quantum mechanical systems can be in a superposition of both states at the same time, a trait that is unique and fundamental to quantum computing.

Quantum computing systems execute algorithms containing quantum logic operations performed on qubits. The sequence of operations is statically compiled into a schedule and the qubits are addressed using an indexing scheme. This algorithm is then executed a sufficiently large number of times until the confidence interval of the computed answer is above a threshold (e.g., ~95+%). Hitting the threshold means that the desired algorithmic result has been reached.

Qubits have been implemented using a variety of different technologies which are capable of manipulating and reading quantum states. These include, but are not limited to quantum dot devices (spin based and spatial based), trapped-ion devices, superconducting quantum computers, optical lattices, nuclear magnetic resonance computers, solid-state NMR Kane quantum devices, electrons-on-helium quantum computers, cavity quantum electrodynamics (CQED) devices, molecular magnet computers, and fullerene-based ESR quantum computers, to name a few. Thus, while a quantum dot device is described below in relation to certain embodiments of the invention, the underlying principles of the invention may be employed in combination with any type of quantum computer including, but not limited to, those listed above. The particular physical implementation used for qubits is orthogonal to the embodiments of the invention described herein.

Quantum Dot Devices

Quantum dots are small semiconductor particles, typically a few nanometers in size. Because of this small size, quantum dots operate according to the rules of quantum mechanics, having optical and electronic properties which differ from macroscopic entities. Quantum dots are sometimes referred to as "artificial atoms" to connote the fact that a quantum dot is a single object with discrete, bound electronic states, as is the case with atoms or molecules.

Figure 1A:
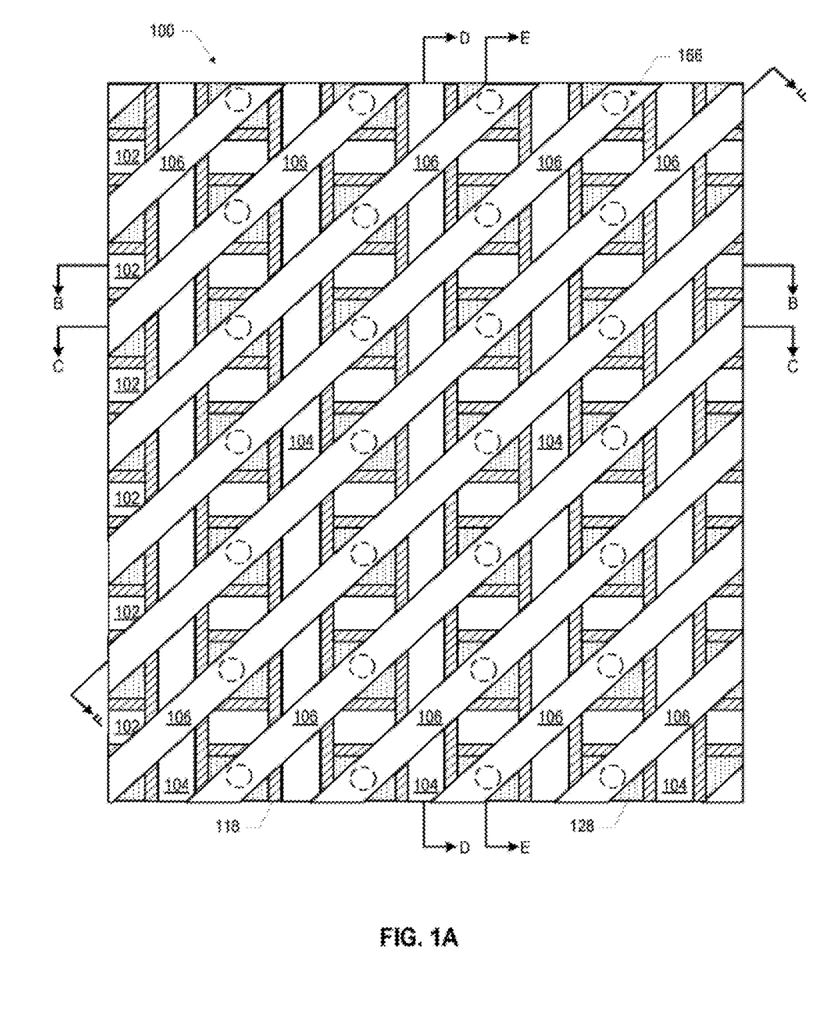
FIGS. 1A-1F illustrate various views of an example quantum dot device, in accordance with one embodiment.
Figure 1B:
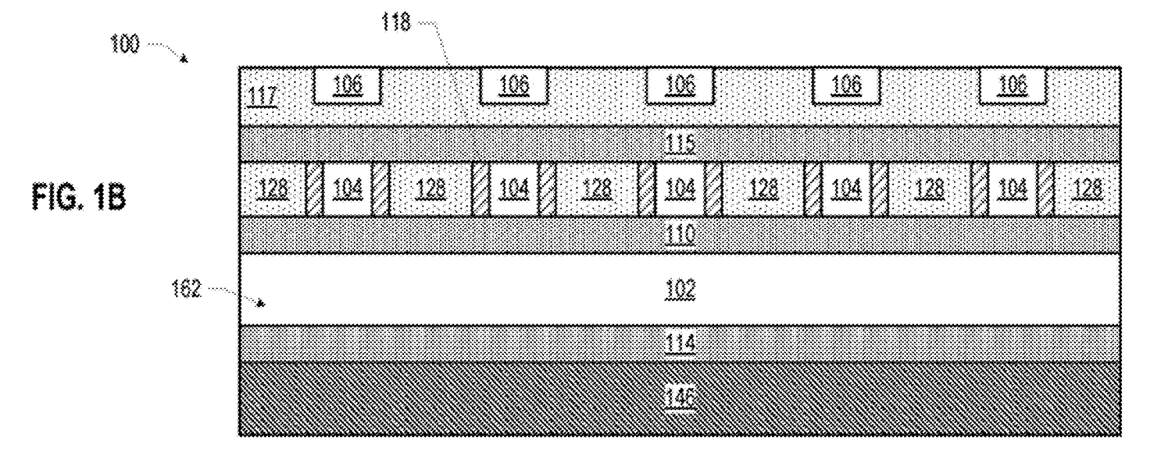
Figure 1C:
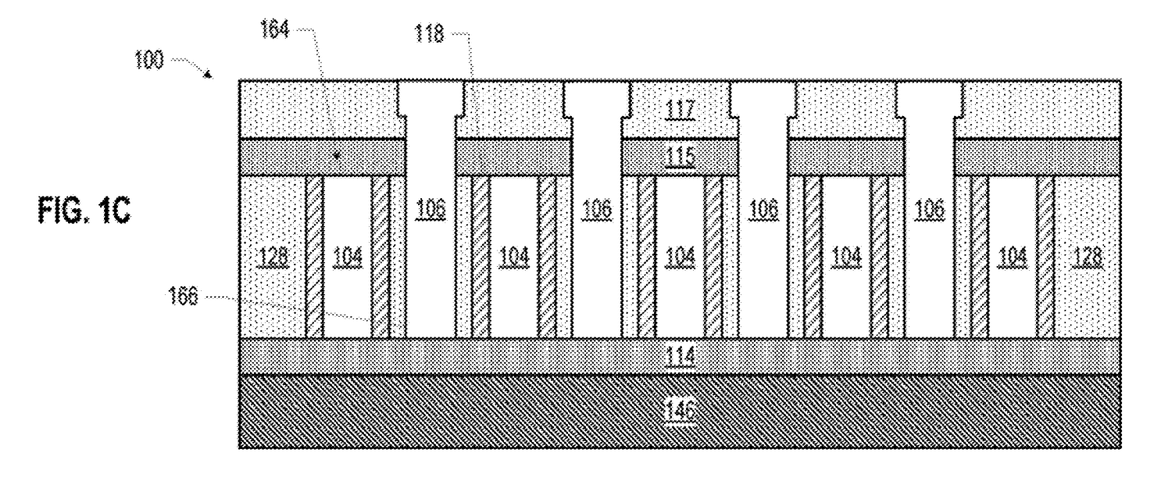
Figure 1D:
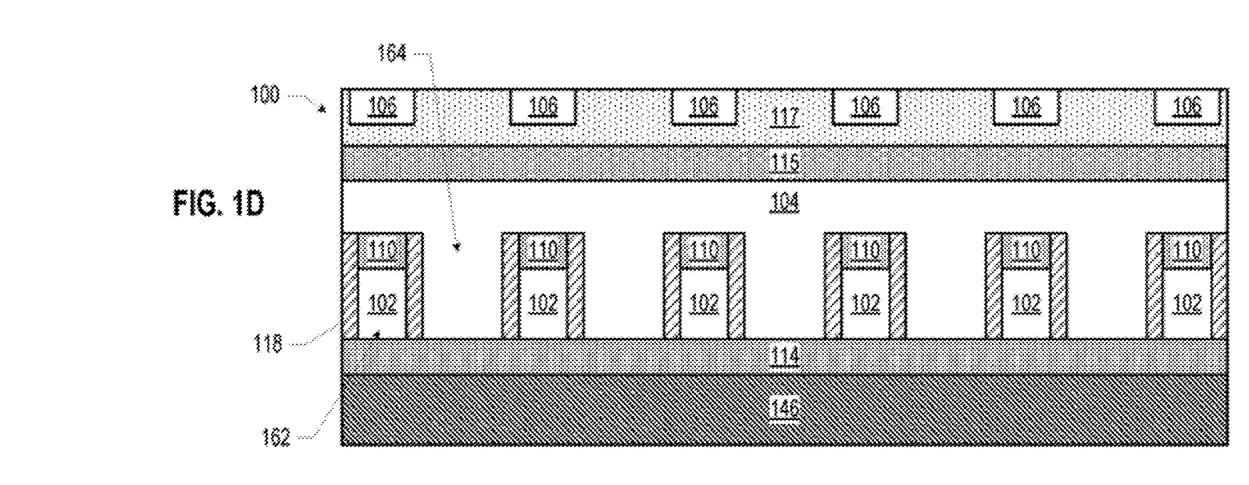
Figure 1E:
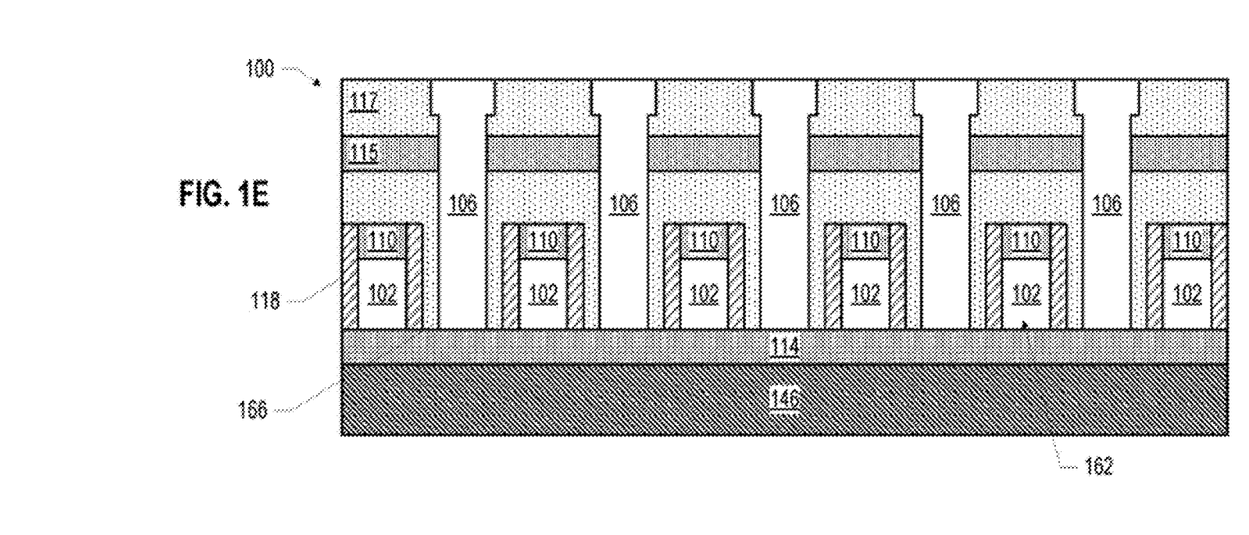
Figure 1F:
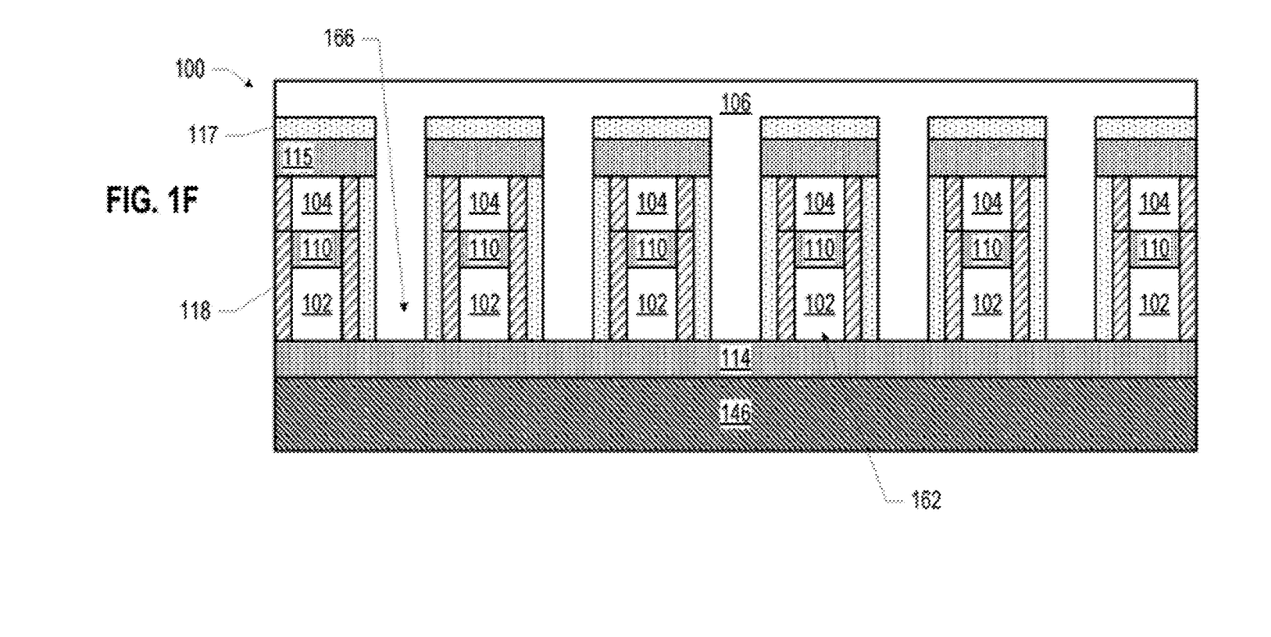

FIGS. 1A-1F are various views of a quantum dot device 100, which may be used with embodiments of the invention described below. FIG. 1A is a top view of a portion of the quantum dot device 100 with some of the materials removed so that the first gate lines 102, the second gate lines 104, and the third gate lines 106 are visible. Although many of the drawings and description herein may refer to a particular set of lines or gates as "barrier" or "quantum dot" lines or gates, respectively, this is simply for ease of discussion, and in other embodiments, the role of "barrier" and "quantum dot" lines and gates may be switched (e.g., barrier gates may instead act as quantum dot gates, and vice versa). FIGS. 1B-1F are side cross-sectional views of the quantum dot device 100 of FIG. 1A; in particular, FIG. 1B is a view through the section B-B of FIG. 1A, FIG. 1C is a view through the section C-C of FIG. 1A, FIG. 1D is a view through the section D-D of FIG. 1A, FIG. 1E is a view through the section E-E of FIG. 1A, and FIG. 1F is a view through the section F-F of FIG. 1A.

The quantum dot device 100 of FIG. 1 may be operated in any of a number of ways. For example, in some embodiments, electrical signals such as voltages, currents, radio frequency (RF), and/or microwave signals, may be provided to one or more first gate line 102, second gate line 104, and/or third gate line 106 to cause a quantum dot (e.g., an electron spin-based quantum dot or a hole spin-based quantum dot) to form in a quantum well stack 146 under a third gate 166 of a third gate line 106. Electrical signals provided to a third gate line 106 may control the electrical potential of a quantum well under the third gates 166 of that third gate line 106, while electrical signals provided to a first gate line 102 (and/or a second gate line 104) may control the potential energy barrier under the first gates 162 of that first gate line 102 (and/or the second gates 164 of that second gate line 104) between adjacent quantum wells. Quantum interactions between quantum dots in different quantum wells in the quantum well stack 146 (e.g., under different quantum dot gates) may be controlled in part by the potential energy barrier provided by the barrier potentials imposed between them (e.g., by intervening barrier gates).

Generally, the quantum dot devices 100 disclosed herein may further include a source of magnetic fields (not shown) that may be used to create an energy difference in the states of a quantum dot (e.g., the spin states of an electron spin-based quantum dot) that are normally degenerate, and the states of the quantum dots (e.g., the spin states) may be manipulated by applying electromagnetic energy to the gates lines to create quantum bits capable of computation. The source of magnetic fields may be one or more magnet lines, as discussed below. Thus, the quantum dot devices 100 disclosed herein may, through controlled application of electromagnetic energy, be able to manipulate the position, number, and quantum state (e.g., spin) of quantum dots in the quantum well stack 146.

In the quantum dot device 100 of FIG. 1, a gate dielectric 114 may be disposed on a quantum well stack 146. A quantum well stack 146 may include at least one quantum well layer 152 (not shown in FIG. 1) in which quantum dots may be localized during operation of the quantum dot device 100. The gate dielectric 114 may be any suitable material, such as a high-k material. Multiple parallel first gate lines 102 may be disposed on the gate dielectric 114, and spacer material 118 may be disposed on side faces of the first gate lines 102. In some embodiments, a patterned hardmask 110 may be disposed on the first gate lines 102 (with the pattern corresponding to the pattern of the first gate lines 102), and the spacer material 118 may extend up the sides of the hardmask 110, as shown. The first gate lines 102 may each be a first gate 162. Different ones of the first gate lines 102 may be electrically controlled in any desired combination (e.g., each first gate line 102 may be separately electrically controlled, or some or all the first gate lines 102 may be shorted together in one or more groups, as desired).

Multiple parallel second gate lines 104 may be disposed over and between the first gate lines 102. As illustrated in FIG. 1, the second gate lines 104 may be arranged perpendicular to the first gate lines 102. The second gate lines 104 may extend over the hardmask 110, and may include second gates 164 that extend down toward the quantum well stack 146 and contact the gate dielectric 114 between adjacent ones of the first gate lines 102, as illustrated in FIG. 1D. In some embodiments, the second gates 164 may fill the area between adjacent ones of the first gate lines 102/spacer material 118 structures; in other embodiments, an insulating material (not shown) may be present between the first gate lines 102/spacer material 118 structures and the proximate second gates 164. In some embodiments, spacer material 118 may be disposed on side faces of the second gate lines 104; in other embodiments, no spacer material 118 may be disposed on side faces of the second gate lines 104. In some embodiments, a hardmask 115 may be disposed above the second gate lines 104. Multiple ones of the second gates 164 of a second gate line 104 are electrically continuous (due to the shared conductive material of the second gate line 104 over the hardmask 110). Different ones of the second gate lines 104 may be electrically controlled in any desired combination (e.g., each second gate line 104 may be separately electrically controlled, or some or all the second gate lines 104 may be shorted together in one or more groups, as desired). Together, the first gate lines 102 and the second gate lines 104 may form a grid, as depicted in FIG. 1.

Multiple parallel third gate lines 106 may be disposed over and between the first gate lines 102 and the second gate lines 104. As illustrated in FIG. 1, the third gate lines 106 may be arranged diagonal to the first gate lines 102, and diagonal to the second gate lines 104. In particular, the third gate lines 106 may be arranged diagonally over the openings in the grid formed by the first gate lines 102 and the second gate lines 104. The third gate lines 106 may include third gates 166 that extend down to the gate dielectric 114 in the openings in the grid formed by the first gate lines 102 and the second gate lines 104; thus, each third gate 166 may be bordered by two different first gate lines 102 and two different second gate lines 104. In some embodiments, the third gates 166 may be bordered by insulating material 128; in other embodiments, the third gates 166 may fill the openings in the grid (e.g., contacting the spacer material 118 disposed on side faces of the adjacent first gate lines 102 and the second gate lines 104, not shown). Additional insulating material 117 may be disposed on and/or around the third gate lines 106. Multiple ones of the third gates 166 of a third gate line 106 are electrically continuous (due to the shared conductive material of the third gate line 106 over the first gate lines 102 and the second gate lines 104). Different ones of the third gate lines 106 may be electrically controlled in any desired combination (e.g., each third gate line 106 may be separately electrically controlled, or some or all the third gate lines 106 may be shorted together in one or more groups, as desired).

Although FIGS. 1A-F illustrate a particular number of first gate lines 102, second gate lines 104, and third gate lines 106, this is simply for illustrative purposes, and any number of first gate lines 102, second gate lines 104, and third gate lines 106 may be included in a quantum dot device 100. Other examples of arrangements of first gate lines 102, second gate lines 104, and third gate lines 106 are possible. Electrical interconnects (e.g., vias and conductive lines) may contact the first gate lines 102, second gate lines 104, and third gate lines 106 in any desired manner.

Not illustrated in FIG. 1 are accumulation regions that may be electrically coupled to the quantum well layer of the quantum well stack 146 (e.g., laterally proximate to the quantum well layer). The accumulation regions may be spaced apart from the gate lines by a thin layer of an intervening dielectric material. The accumulation regions may be regions in which carriers accumulate (e.g., due to doping, or due to the presence of large electrodes that pull carriers into the quantum well layer), and may serve as reservoirs of carriers that can be selectively drawn into the areas of the quantum well layer under the third gates 166 (e.g., by controlling the voltages on the quantum dot gates, the first gates 162, and the second gates 164) to form carrier-based quantum dots (e.g., electron or hole quantum dots, including a single charge carrier, multiple charge carriers, or no charge carriers). In other embodiments, a quantum dot device 100 may not include lateral accumulation regions, but may instead include doped layers within the quantum well stack 146. These doped layers may provide the carriers to the quantum well layer. Any combination of accumulation regions (e.g., doped or non-doped) or doped layers in a quantum well stack 146 may be used in any of the embodiments of the quantum dot devices 100 disclosed herein.

Apparatus and Method for Drift Compensation in a Quantum Computer

Control operations on quantum bits in a continuously operating quantum computer processor depend heavily on the fault tolerance of the system. For example, control operations may depend on the system remaining below the sub-fault tolerant threshold (e.g., <99.5% per operation). Over time, during multiple algorithm execution cycles, the system tends to drift due to charge noise in the semiconductor substrate, which in one embodiment comprises Silicon-Germanium (SiGe). In addition to the SiGe substrate, imperfect control pulse generation electronics, unclean continuous DC voltages, and even cosmic rays all increase the error rate during subsequent algorithm runs. This is a significant ongoing challenge to achieving scalable operation of a large system of qubits that will be useful for solving real world problems.

To mitigate the accumulative and ongoing drift in the system, one embodiment of the invention implements a just-in-time (JIT) quantum compiler and a quantum error correction (QEC) unit to adjust for the system drift during execution of a quantum algorithm. In particular, the QEC unit accumulates detected errors in a buffer during the error correction cycle of each algorithm run and a drift detection unit manages the buffer and triggers a corrective action once it reaches a preprogrammed error threshold.

In one embodiment, when the programmed correction threshold is reached, the system executes a diagnostic algorithm with a pre-known result to determine a noise correction for each qubit in the QEC tile. A just-in-time (JIT) compiler is then signaled to read the buffer and recompile the quantum algorithm with these precomputed compensation values. Once the average drift in the system is too large to correct, an automatic recalibration of the quantum computing system is performed and the DLAB is flushed.

Figure 2:
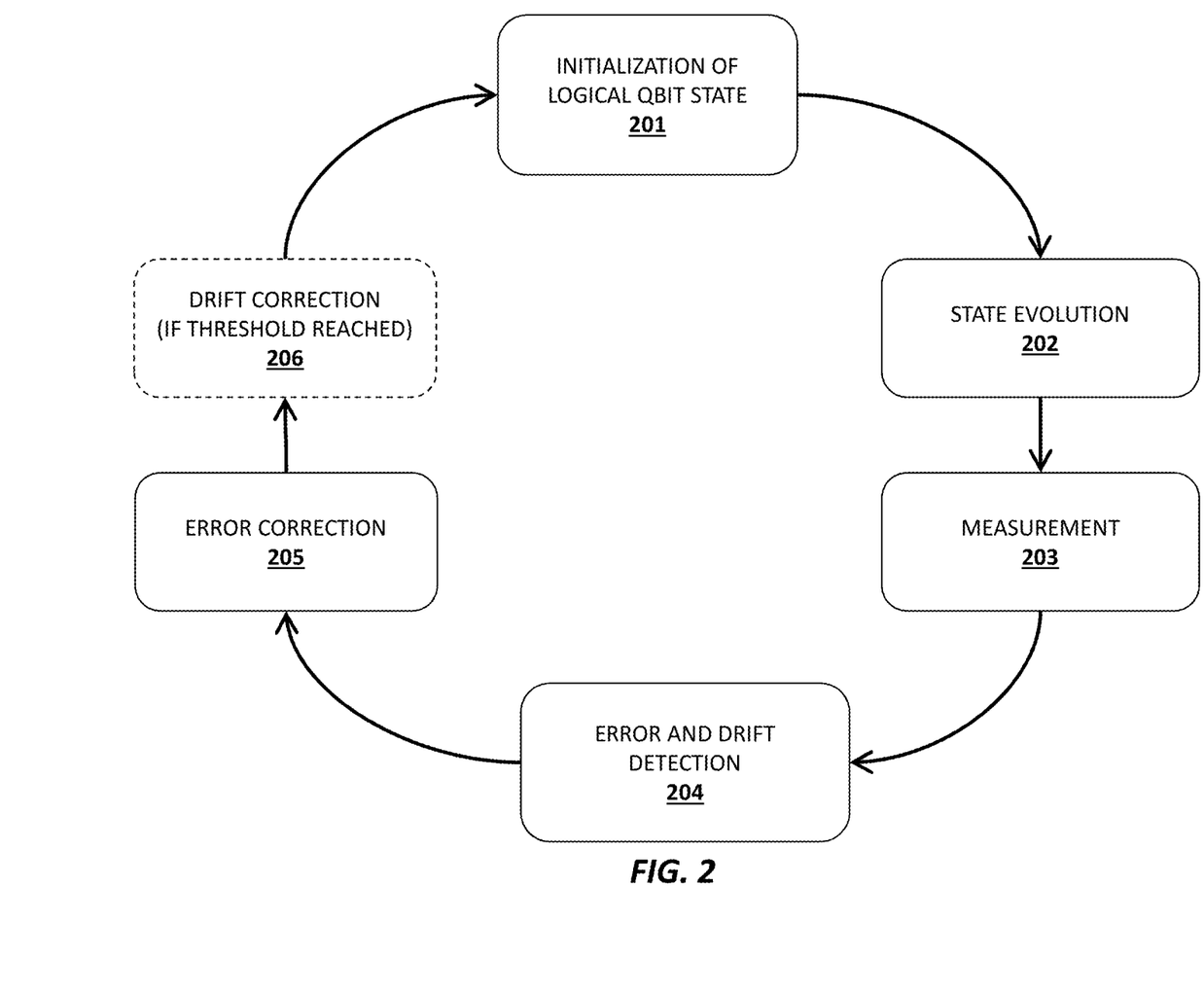
FIG. 2 illustrates a sequence of operations for a quantum computer including error correction and drift correction.

FIG. 2 illustrates one embodiment of a quantum error correction cycle. At 201 the logical qubit state of the system is initialized. For example, if electron spin is used as the quantum state, then electrons within the quantum system may be prepared (e.g., initialized to a particular spin orientation and/or entangled using electromagnetic control signals from the quantum controller). At 202, the state of the quantum system evolves in response to additional electromagnetic inputs specified by the quantum runtime and physically implemented by the quantum controller.

At 203, a measurement of the quantum system is taken. For example, the current spin of one of the entangled electrons may be measured. The system may subsequently be re-initialized prior to the next measurement (i.e., given that taking a measurement or learning any information about the quantum system disrupts the quantum state). The physical qubits may be periodically measured for the error correction cycle. At 204, error and drift detection is performed on the measured results to determine whether one or multiple errors have occurred (e.g., random flip(s) of one or more qubit(s)). An error correction operation is performed at 205, which attempts to correct any detected errors. At 206, if a drift threshold has been reached, drift correction is implemented as described herein. For example, in one embodiment, a JIT compiler generates a new quantum runtime based on the detected drift.

Figure 3:
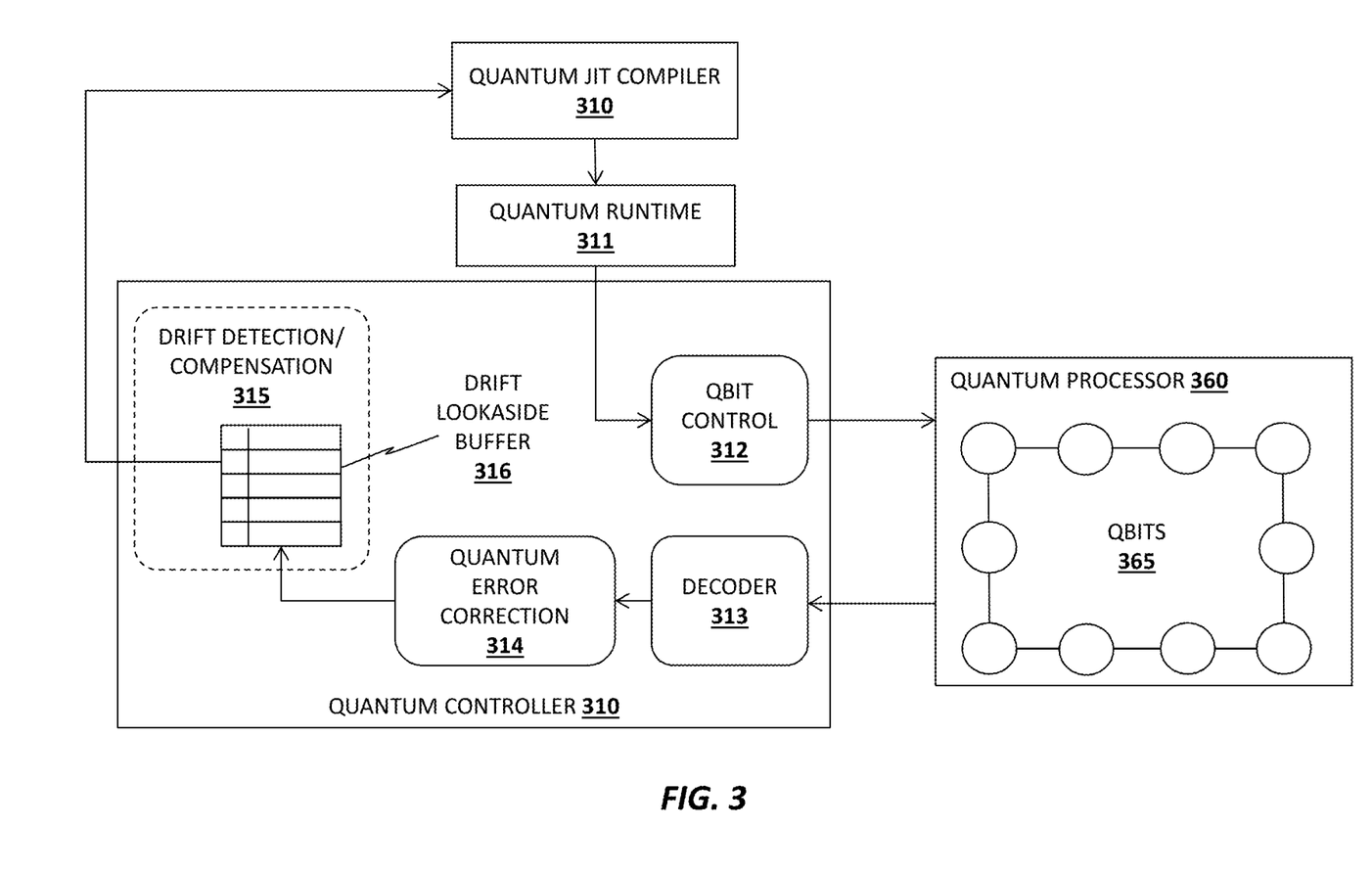
FIG. 3 illustrates one embodiment of a quantum controller with drift detection and compensation.

FIG. 3 illustrates an exemplary quantum controller 310 for performing quantum error/drift detection and correction on results generated by a quantum processor 360. In operation, a decoder 313 takes a multi-qubit measurement from the quantum processor 360 which does not disturb the quantum information in the encoded state but contains information about the error. For example, the qubits 365 may include one or more ancilla qubits which are used to protect the integrity of the data encoded in the data qubits, which contain the underlying data resulting from a quantum operation. In one implementation, the error syndrome data from the ancilla qubits can be used by the quantum error correction (QEC) unit 314 to determine whether a data qubit has been corrupted, to identify the physical qubit which was affected and in some cases to determine which of several possible ways it was affected.

Figure 4:
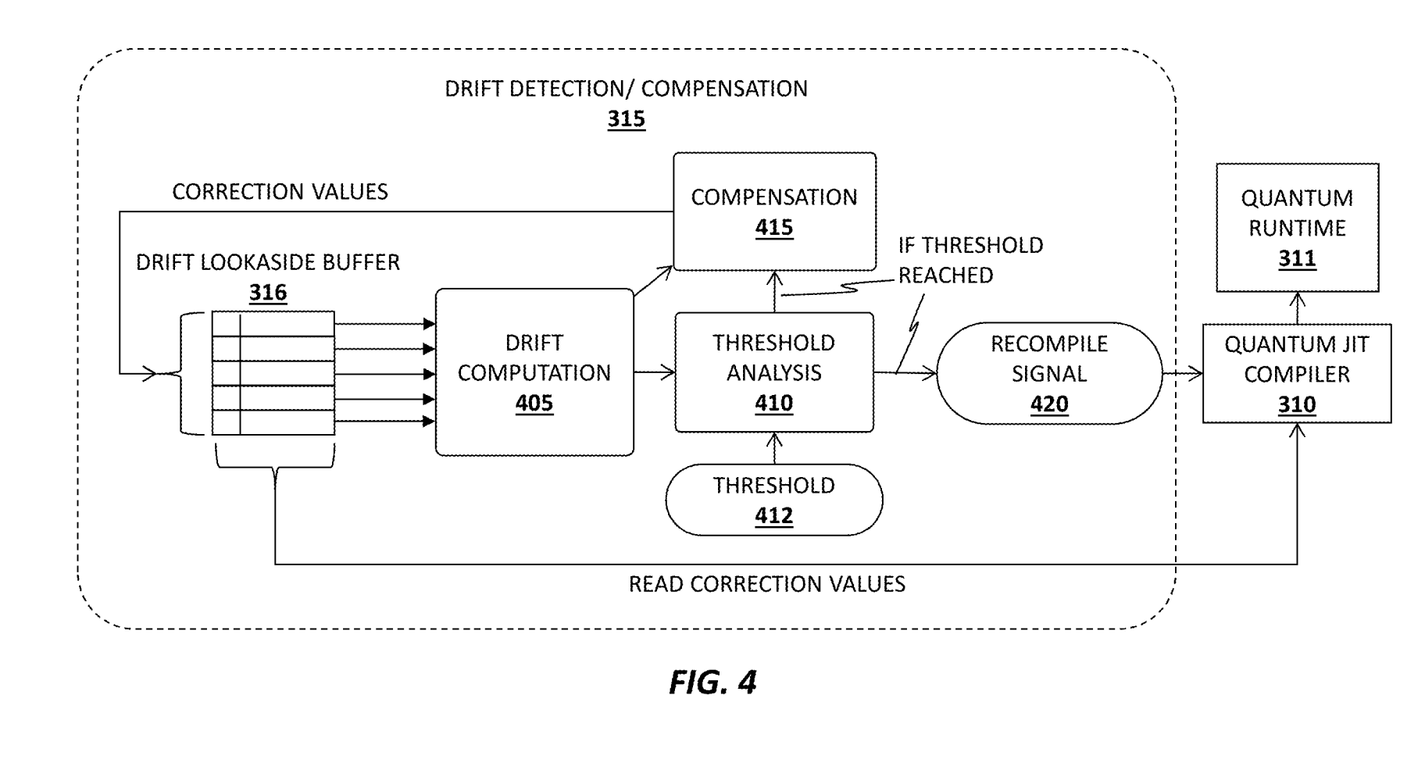
FIG. 4 illustrates one embodiment of a drift detection and compensation circuit.

FIG. 4 illustrates additional detail for one embodiment of the drift detection/compensation unit 315. In this embodiment, the QEC unit 314 accumulates detected Z (Phase) and X (Bit-Flip) errors in a Drift Lookaside Buffer (DLAB) 316 during the error correction cycle of each algorithm run. A drift computation unit 405 determines a current system drift for the quantum processor 360. This may comprise, for example, an average system drift. A threshold analysis unit 410 (e.g., which may implemented as a comparator) compares a pre-specified threshold 412 with the current system drift. If the threshold 412 has been reached or exceeded, then a compensation unit 415 executes diagnostics such as Hahn Echo read-out, Randomized Benchmarking, or any quantum algorithm with a pre-known result to determine a noise correction to be applied for each qubit in the QEC tile.

In one embodiment, the drift lookaside buffer 316 uses a table data structure with at least one entry for each qubit. If the compensation unit 415 determines a noise correction for a qubit, the associated correction values are stored in the table entry of the drift lookaside buffer 316 associated with that qubit.

Upon reaching/exceeding the threshold 412, a recompile signal 420 is generated. In response, the quantum just-in-time (JIT) compiler 310 reads the DLAB 316 (e.g., using a qubit ID or other identifier as an index) and recompiles the quantum algorithm with these precomputed compensation values. The new quantum runtime 311 is then executed by the qubit control unit 312, controlling the qubits in accordance with the new correction values. In one embodiment, once the average drift in the system is too large to correct, an automatic recalibration of the quantum computing system is performed and the drift lookaside buffer 316 is flushed.

Figure 5:
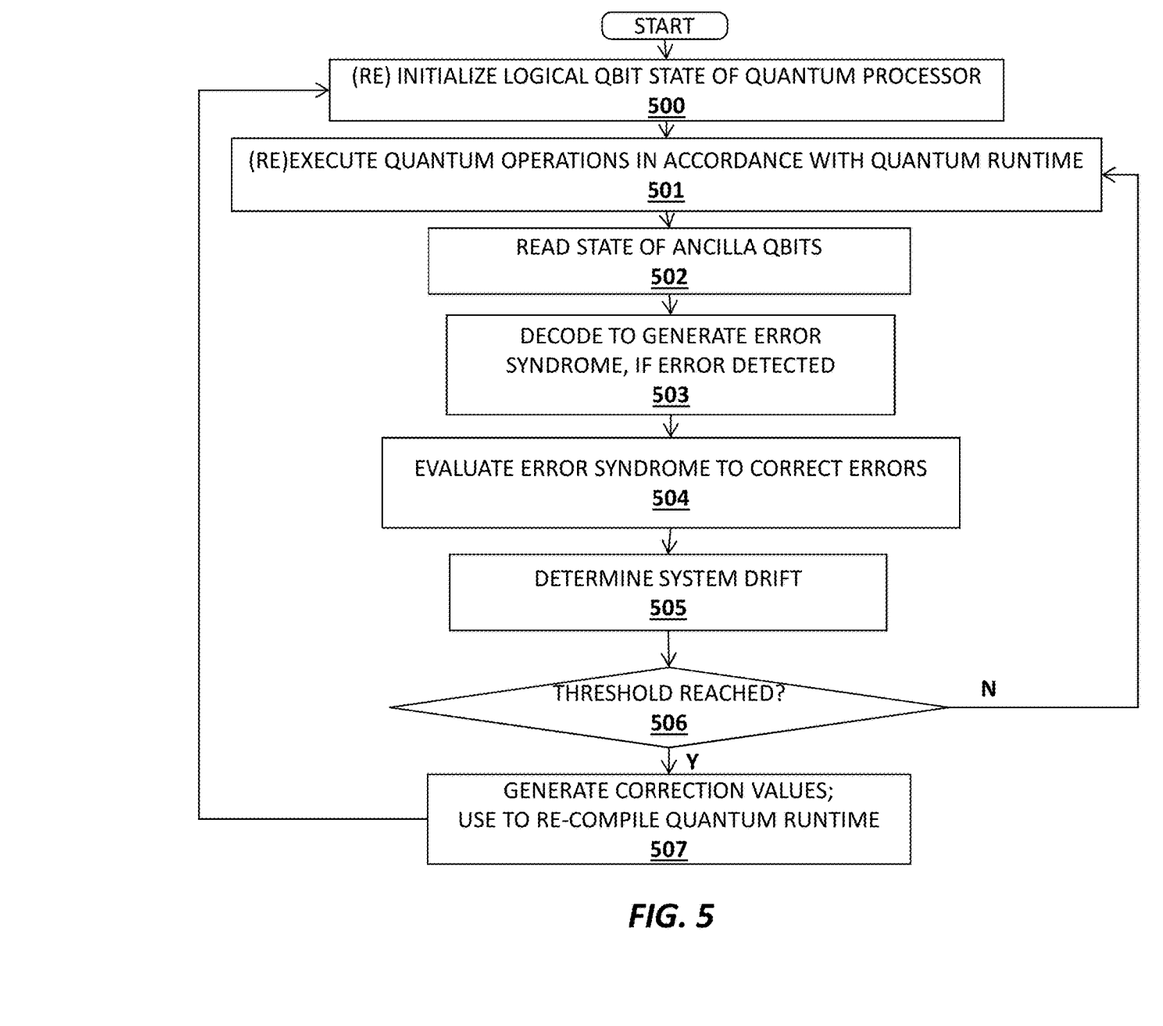
FIG. 5 illustrates a sequence of operations for performing error correction and drift compensation.

A method in accordance with one embodiment is illustrated in FIG. 5. The method may be implemented within the context of the quantum system architectures described herein, but is not limited to any particular type of quantum system.

At 500 the logical state of the qubits is initialized on the quantum processor. For example, the qubits may be initialized to a particular spin orientation and/or entangled using electromagnetic control signals from the quantum controller. At 501, quantum operations are executed (e.g., in accordance with a quantum runtime). The state of the quantum system evolves in response to additional electromagnetic inputs specified by the quantum runtime and physically implemented by the quantum controller. As mentioned, the techniques described herein may be implemented once the quantum computer enters a quiescent state. A diagnostic mode may then be executed in which a specific set of representative quantum algorithms with known outcomes is executed. In addition, these learning techniques may be performed during normal system operation.

At 502 the state of the ancilla qubits is read and, at 503, decoded to generate an error syndrome if an error is detected. At 504, the error syndrome is decoded evaluated to perform error correction. As described above, detected Z (Phase) and X (Bit-Flip) errors may be collected in a Drift Lookaside Buffer (DLAB) during the error correction cycle of each algorithm run.

At 505, a level of system drift is determined. For example, the average system drift may be determined based on the detected Z and X errors stored in the drift lookaside buffer. If a drift threshold is reached, determined at 506, then correction values are generated to compensate for the drift and used to re-compile the quantum runtime at 507.

EXAMPLES

The following are example implementations of different embodiments of the invention.

Example 1

A method comprising: executing quantum operations on a quantum processor in accordance with a quantum runtime, the quantum operations physically implemented on a plurality of quantum bits (qubits); measuring values from all or a subset of the plurality of qubits; decoding the values to detect errors associated with the qubits; determining a current system drift for the quantum processor based on the errors; and regenerating the quantum runtime using compensation values if the current system drift is determined to be above a threshold.

Example 2

The method of Example 1 wherein the errors include phase (Z) and bit-flip (X) errors.

Example 3

The method of Example 1 further comprising: calculating the compensation values by determining a noise correction value for each qubit.

Example 4

The method of Example 3 further comprising: storing the compensation values in a drift lookaside buffer having a plurality of entries with at least one entry for each qubit, the entry including a compensation value associated with its respective qubit.

Example 5

The method of Example 4 wherein recomputing the quantum runtime comprises invoking a quantum just-in-time (JIT) compiler to responsively read the drift lookaside buffer and recompile the quantum runtime using the compensation values.

Example 6

The method of Example 4 further comprising: storing the errors detected for each qubit in a drift compensation buffer entry associated with that qubit; and evaluating the errors to determine when the system drift has reached or risen above the threshold.

Example 7

The method of Example 6 wherein the compensation values comprise noise correction values generated by executing a sequence of operations with a predetermined result to determine a noise correction for each qubit.

Example 8

The method of Example 7 wherein the sequence of operations comprises a diagnostic process selected from a group consisting of: Hahn Echo read-out or Randomized Benchmarking.

Example 9

A machine-readable medium having program code stored thereon which, when executed by a machine, causes the machine to perform the operations of: executing quantum operations on a quantum processor in accordance with a quantum runtime, the quantum operations physically implemented on a plurality of quantum bits (qubits); measuring values from all or a subset of the plurality of qubits; decoding the values to detect errors associated with the qubits; determining a current system drift for the quantum processor based on the errors; and regenerating the quantum runtime using compensation values if the current system drift is determined to be above a threshold.

Example 10

The machine-readable medium of Example 9 wherein the errors include phase (Z) and bit-flip (X) errors.

Example 11

The machine-readable medium of Example 9 further comprising program code to cause the machine to perform the operations of: calculating the compensation values by determining a noise correction value for each qubit.

Example 12

The machine-readable medium of Example 11 further comprising program code to cause the machine to perform the operations of: storing the compensation values in a drift lookaside buffer having a plurality of entries with at least one entry for each qubit, the entry including a compensation value associated with its respective qubit.

Example 13

The machine-readable medium of Example 12 wherein recomputing the quantum runtime comprises invoking a quantum just-in-time (JIT) compiler to responsively read the drift lookaside buffer and recompile the quantum runtime using the compensation values.

Example 14

The machine-readable medium of Example 12 further comprising program code to cause the machine to perform the operations of: storing the errors detected for each qubit in a drift compensation buffer entry associated with that qubit; and evaluating the errors to determine when the system drift has reached or risen above the threshold.

Example 15

The machine-readable medium of Example 14 wherein the compensation values comprise noise correction values generated by executing a sequence of operations with a predetermined result to determine a noise correction for each qubit.

Example 16

The machine-readable medium of Example 15 wherein the sequence of operations comprises a diagnostic process selected from a group consisting of: Hahn Echo read-out or Randomized Benchmarking.

Example 18

A quantum system comprising: a quantum processor comprising one or more data quantum bits (qubits) and one or more ancilla qubits; a quantum controller to control the qubits responsive to a quantum runtime; an error detector to detect errors in the qubits; a quantum drift compensator to determine a current system drift for the quantum processor based on the errors and to responsively generate a set of compensation values if the current system drift is determined to be above a threshold.

Example 19

The quantum system of Example 18 wherein the errors include phase (Z) and bit-flip (X) errors.

Example 20

The quantum system of Example 18 wherein the quantum drift compensator is to calculate the compensation values by determining a noise correction value for each qubit.

Example 21

The quantum system of Example 20 wherein the quantum drift compensator comprises a drift lookaside buffer having a plurality of entries with at least one entry for each qubit, the entry including a compensation value associated with its respective qubit.

Example 22

The quantum system of Example 21 wherein recomputing the quantum runtime comprises invoking a quantum just-in-time (JIT) compiler to responsively read the drift lookaside buffer and recompile the quantum runtime using the compensation values.

Example 23

The quantum system of Example 21 wherein the errors detected for each qubit are stored in a drift compensation buffer entry associated with that qubit, the drift compensator to evaluate the errors to determine when the system drift has reached or risen above the threshold.

Example 24

The quantum system of Example 23 wherein the compensation values comprise noise correction values generated by executing a sequence of operations with a predetermined result to determine a noise correction for each qubit.

Example 25

The quantum system of Example 24 wherein the sequence of operations comprises a diagnostic process selected from a group consisting of: Hahn Echo read-out or Randomized Benchmarking.

The embodiments described herein may be used to improve fault tolerance and efficiently correct for system drift in quantum computing systems. This effectively reduces the costs associated with building and maintaining quantum computing hardware by moving complexity to software. These embodiments also add flexibility and scalability of the quantum computing system.

In the above detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments. Terms like "first," "second," "third," etc. do not imply a particular ordering, unless otherwise specified.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
   compiling one or more quantum algorithms to generate a quantum runtime;
   executing quantum operations on a quantum processor in accordance with the quantum runtime, the quantum operations physically implemented on a plurality of quantum bits (qubits) based on inputs specified by the quantum runtime;
   measuring values from all or a subset of the plurality of qubits;
   decoding the values to detect errors associated with the qubits;
   determining a current system drift for the quantum processor based on the errors;
   recompiling the one or more quantum algorithms using compensation values to generate a new quantum runtime when the current system drift is determined to be above a first threshold but below a second threshold; and
   resetting the quantum processor when the current drift is determined to be above the second threshold.

2. The method of claim 1 wherein the errors include phase (Z) and bit-flip (X) errors.

3. The method of claim 1 further comprising:
   calculating the compensation values by determining a noise correction value for each qubit.

4. The method of claim 3 further comprising:
   storing the compensation values in a drift lookaside buffer having a plurality of entries with at least one entry for each qubit, the entry including a compensation value associated with its respective qubit.

5. The method of claim 4 wherein recompiling the one or more quantum algorithms comprises invoking a quantum just-in-time (JIT) compiler to responsively read the compensation values from the drift lookaside buffer and to recompile the one or more quantum algorithms using the compensation values.

6. The method of claim 4 further comprising:
   storing the errors detected for each qubit in a drift compensation buffer entry associated with that qubit; and
   evaluating the errors to determine when the system drift has reached or risen above the first and/or the second threshold.

7. The method of claim 6 wherein the compensation values comprise noise correction values generated by executing a sequence of operations associated with a known result and comparing the known result with an actual result from the execution of the sequence of operations to determine a noise correction for each qubit.

8. The method of claim 1 wherein the inputs specified by the quantum runtime comprise electro-magnetic inputs to affect one or more states of the plurality of qubits.

9. A machine-readable medium having program code stored thereon which, when executed by a machine, causes the machine to perform the operations of:
   compiling one or more quantum algorithms to generate a quantum runtime;
   executing quantum operations on a quantum processor in accordance with the quantum runtime, the quantum operations physically implemented on a plurality of quantum bits (qubits) based on inputs specified by the quantum runtime;
   measuring values from all or a subset of the plurality of qubits;
   decoding the values to detect errors associated with the qubits;
   determining a current system drift for the quantum processor based on the errors;
   recompiling the one or more quantum algorithms using compensation values to generate a new quantum runtime when the current system drift is determined to be above a first threshold but below a second threshold; and
   resetting the quantum processor when the current drift is determined to be above the second threshold.

10. The machine-readable medium of claim 9 wherein the errors include phase (Z) and bit-flip (X) errors.

11. The machine-readable medium of claim 9 further comprising program code to cause the machine to perform the operations of:
    calculating the compensation values by determining a noise correction value for each qubit.

12. The machine-readable medium of claim 11 further comprising program code to cause the machine to perform the operations of:
    storing the compensation values in a drift lookaside buffer having a plurality of entries with at least one entry for each qubit, the entry including a compensation value associated with its respective qubit.

13. The machine-readable medium of claim 12 wherein recompiling the one or more quantum algorithms comprises invoking a quantum just-in-time (JIT) compiler to responsively read the compensation values from the drift lookaside buffer and to recompile the one or more quantum algorithms using the compensation values.

14. The machine-readable medium of claim 12 further comprising program code to cause the machine to perform the operations of:
storing the errors detected for each qubit in a drift compensation buffer entry associated with that qubit; and
evaluating the errors to determine when the system drift has reached or risen above the first and/or the second threshold.

15. The machine-readable medium of claim 14 wherein the compensation values comprise noise correction values generated by executing a sequence of operations with a known result and comparing the known result with an actual result from the execution of the sequence of operations to determine a noise correction for each qubit.

16. The machine-readable medium of claim 15 wherein the sequence of operations comprises a diagnostic process selected from a group consisting of: Hahn Echo read-out or Randomized Benchmarking.

17. A quantum system comprising:
a quantum processor comprising one or more data quantum bits (qubits) and one or more ancilla qubits;
a quantum controller to control the qubits responsive to a quantum runtime, the quantum runtime generated from compiling one or more quantum algorithms;
an error detector to detect errors in the qubits;
a quantum drift compensator to determine a current system drift for the quantum processor based on the errors and to responsively generate a set of compensation values if the current system drift is determined to be above a first threshold; and
a quantum just-in-time (JIT) compiler to responsively recompile the one or more quantum algorithms using the set of compensation values when the current system drift is determined to be above the first threshold but below a second threshold,
wherein the quantum system is reset when the current drift is determined to be above the second threshold.

18. The quantum system of claim 17 wherein the errors include phase (Z) and bit-flip (X) errors.

19. The quantum system of claim 17 wherein the quantum drift compensator is to calculate the compensation values by determining a noise correction value for each qubit by comparing a current result generated from a first qubit implementing a first quantum algorithm with an expected result associated with the first quantum algorithm.

20. The quantum system of claim 19 wherein the quantum drift compensator comprises a drift lookaside buffer having a plurality of entries with at least one entry for each qubit, the entry including a compensation value associated with its respective qubit.

21. The quantum system of claim 20 wherein the quantum just-in-time (JIT) compiler is to read the compensation values from the drift lookaside buffer.

22. The quantum system of claim 20 wherein the errors detected for each qubit are stored in a drift compensation buffer entry associated with that qubit, the drift compensator to evaluate the errors to determine when the system drift has reached or risen above the threshold.

23. The quantum system of claim 22 wherein the compensation values comprise noise correction values generated by executing a sequence of operations with a predetermined result to determine a noise correction for each qubit.

24. The quantum system of claim 23 wherein the sequence of operations comprises a diagnostic process selected from a group consisting of: Hahn Echo read-out or Randomized Benchmarking.

* * * * *